United States Patent Office 3,190,911
Patented June 22, 1965

3,190,911
3-CYCLOHEXENYL-METHYL N-METHYL-CARBAMATE
John R. Kilsheimer, Westfield, N.J., assignor to Union Carbide Corporation, a corporation of New York
No Drawing. Filed Apr. 2, 1963, Ser. No. 269,884
1 Claim. (Cl. 260—482)

This invention relates to a new chemical compound useful as an insecticide.

The compound of this invention is 3-cyclohexenylmethyl N-methylcarbamate and can be represented by the following structural formula

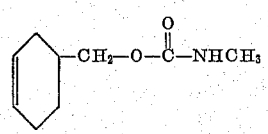

This compound can be prepared in various ways, for example by the addition of methyl isocyanate to 3-cyclohexenyl methanol, as illustrated by the following example.

*Example I*

A charge of 50 grams of 3-cyclohexenyl methanol, 45 grams of methyl isocyanate, and 75 milliliters of anhydrous diethyl ether was introduced into a pressure bottle which was then tightly stoppered and allowed to stand at room temperature for forty-eight hours. After this time excess methyl isocyanate and the ether solvent were evaporated from the reaction product mixture under reduced pressure and the liquid residue was distilled through an eight-inch Vigreux column. The product 3-cyclohexenylmethyl N-methylcarbamate was obtained in a yield corresponding to 91 percent of theory, as a clear oil having a boiling point of 88° C. at 0.4 millimeter of mercury and the following nitrogen analysis: calculated, 8.28%; found, 8.07%.

Alternatively, the compound of this invention can be prepared by a two-step synthesis involving addition of phosgene to the corresponding alcohol followed by reaction of the resulting chloroformate with methylamine to yield the desired carbamate.

I have found that the compound of this invention possesses outstanding value as an insecticide and can be applied either to insects directly or to a locus to be protected from insects to exert preventive or repellent effects.

In one test, my compound was formulated by dissolving one gram of compound in 50 milliliters of acetone in which had been dissolved 0.1 gram (10 percent of the weight of compound) of an alkylphenoxy polyethoxyethanol surfactant, as an emulsifying or dispersing agent. The resulting solution was mixed into 150 milliliters of water to give roughly 200 milliliters of a suspension containing the compound in finely divided form. The thus-prepared stock suspension contained 0.5 percent by weight of compound. The test concentration employed in the test described hereinbelow was obtained by diluting the stock suspension with water to give a formulation containing 1000 parts of compound per million parts of formulation.

Larvae of the southern armyworm (*Prodenia eridania*, Cram.), reared on Tendergreen bean plants at a temperature of 80±5° F. and a relative humidity of 50±5 percent, constituted the test insects. The test larvae were removed from the colony and held without food for four hours prior to the test. Paired seed leaves, excised from Tendergreen bean plants, were dipped in the test formulation until thoroughly wetted, excess liquid being removed by gentle shaking. While the leaves were drying in a ventilated hood, wilting was prevented by placing the stems in water. When dry, the paired leaves were separated and each one was placed in a 9-centimeter Petri dish lined with filter paper. Four randomly selected larvae were introduced into each dish and the dishes were closed. The closed dishes were labeled and held at 80–85° F. for three days. Although the larvae could easily consume the whole leaf within twenty-four hours, no more food was added. Larvae which were unable to move the length of the body, even upon stimulation by prodding, were considered dead. Application of 3-cyclohexenylmethyl N-methylcarbamate resulted in 80 to 100 percent mortality while a control test carried out as above but without addition of test compound resulted in no kill of larvae.

In the practical application of my compound as an insecticide, it will be desirable to combine it with an inert carrier, either liquid or solid.

Suitable liquid diluents or carriers include water, petroleum distillates, or other liquid carriers with or without surface active agents. Liquid concentrates may be prepared by dissolving one of these compounds with a non-phytotoxic solvent such as acetone, xylene, or nitrobenzene and dispersing the toxicants in water with the aid of suitable surface active dispersing agents.

The choice of dispersing and emulsifying agent and the amount employed is dictated by the nature of the composition and the ability of the agent to facilitate the dispersion of the toxicant. Generally, it is desirable to use as little of the agent as is possible, consistent with the desired dispersion of the toxicant in the spray so that rain does not re-emulsify the toxicant after it is applied to the plant and wash it off the plant. Nonionic, anionic, or cationic dispersing and emulsifying agents may be employed, for example, the condensation products of alkylene oxides with phenol and organic acids, alkyl aryl sulfonates, complex ether alcohols, quaternary ammonium compounds, and the like.

In the preparation of wettable powder or dust or granulated compositions, the active ingredient is dispersed in and on an appropriately divided solid carrier such as clay, talc, bentonite, diatomaceous earth, fuller's earth, and the like. In the formulation of the wettable powders the aforementioned dispersing agents as well as lignosulfonates can be included.

The required amount of the toxicants contemplated herein may be applied per acre treated in from 1 to 200 gallons or more of liquid carrier diluent or in from about 5 to 500 pounds of inert solid carrier or diluent. The concentration in the liquid concentrate will usually vary from about 10 to 95 percent by weight and in the solid formulations from about 0.5 to about 90 percent by weight. Satisfactory sprays, dusts, or granules for general use contain from about ¼ to 15 pounds of active toxicant per acre.

What is claimed is:
3-cyclohexenylmethyl N-methylcarbamate.

References Cited by the Examiner
French: J.A.C.S., vol. 64, pp. 1497–99 (1942).

LORRAINE A. WEINBERGER,
*Acting Primary Examiner.*
LEON ZITVER, *Examiner.*